INVENTOR.
FRED B. DANIELS
BY William D. Hall
ATTORNEY

UNITED STATES PATENT OFFICE 2,629,784

WIDE FREQUENCY-RANGE MAGNETIC RECORDING AND REPRODUCING SYSTEM

Fred B. Daniels, New York, N. Y.

Application January 17, 1945, Serial No. 573,235

15 Claims. (Cl. 179—100.2)

(Granted under Title 35, U. S. Code (1952), sec. 266)

The invention described herein may be manufactured and used by or for the Government for governmental purposes, without the payment to me of any royalty thereon.

This invention relates to an apparatus for recording and reproducing wide range of frequencies on a magnetic tape.

In conventional magnetic recording systems, the unequalized frequency response, for constant current input, can be represented by a curve of the general shape shown in Fig. 2. The position of the peak of this curve depends upon the characteristics of the recording medium (tape, wire, or powder-coated tape), and upon the linear velocity of the medium. At low frequencies, the response is proportional to the frequency in the 100 to 3200 cycles range rising at a rate of approximately 6 db per octave as the frequency is increased to 3200 cycles, the response reaching a maximum at approximately 4500 cycles, and having a rapidly drooping characteristic in the higher frequency-range.

Heretofore, in order to obtain uniform response over a wide band of frequencies, equalization is resorted to, those frequencies for which the response is lower than that of the peak being emphasized in such a manner that the over-all response curve is flat. This procedure, however, cannot be extended to zero frequency, and, therefore, transients, or even continuous signals with very low frequency components, could not be recorded. Furthermore, experience has shown that in magnetic recording systems the lower frequencies are subject to severe distortion, and although equalization reduces this distortion somewhat, it does not eliminate it.

In order to record transients and very low frequencies, it has been proposed to modulate a carrier frequency with the signal and to record the modulated carrier. ("A New Instrument for Recording Transient Phenomena", by S. J. Begun, Electrical Engineering Transactions, April 1942, pp. 175–177.) However, this modulated carrier method does not result in a wide band system, as the carrier frequency must be some large multiple of the highest modulating frequency, but must still be low enough to be recorded magnetically. Accordingly, when the carrier frequency is modulated by the entire signal, the signal itself extending into a high audio frequency spectrum, there is either a loss, distortion, or both, of high audio frequencies, the distortion and the accompanying loss taking place when the carrier frequency is not high enough for acting as a carrier but is recordable on the magnetic medium, and a loss of all frequencies when the carrier frequency is sufficiently high to act as an effective carrier for the signal, but is too high for the magnetic material, and is, therefore, not recordable on the magnetic medium.

The disclosed invention solves this difficulty with the result that the proposed system can be used to record a wide band of frequencies, from zero up to a frequency which is determined only by the upper limit recordable on used magnetic medium.

According to the invention, a magnetic tape of sufficient width is used to record simultaneously the outputs of two complementary channels, one channel recording the low frequency components of the signal, while the other—the high frequency components. The magnetic tape may be a steel tape, powder-coated tape, or any suitable magnetic material, of such shape and width that two independent channels can be recorded upon it simultaneously without mutual interference. The signal, the recording of which is desired, is impressed on two parallel recording channels, one of the channels being a low frequency band channel, while the other is a high frequency band channel. The low frequency channel consists of a low-pass filter connected on its input side to the source of signals, and on its output side to a modulator, the carrier frequency being provided by a local oscillator. The output of the modulator is impressed, after sufficient amplification if such is necessary, on a recording magnetic head which records the low frequencies of the signals as a modulated signal on one side of the magnetic tape. The high frequency channel consists of a high-pass filter, the output of which, after being amplified, is also impressed on a recording head, the latter recording the high frequencies without any modulation on the other side of the same magnetic tape. The recording heads of both high and low frequency channels may be biassed by passing a steady current or an alternating current of supersonic frequency, such as 50,000 cycles, through them while recording. The former method of biassing results in an increased signal level and decreased signal distortion, while the latter method of biasing, in addition to the improvement similar to the improvement resulting from the D. C. biassing, i. e., increased signal level and decreased distortion, also gives a greatly reduced noise level, as set forth in U. S. Patent No. 2,235,132, to Dean E. Wooldridge, of March 18, 1941. If a supersonic alternating current is used for biassing, it may be obtained from a separate oscillator or from a harmonic frequency of the carrier oscillator.

The reproducing system consists of both high and low frequency reproducing channels, each channel provided with its own reproducing magnetic head. In the low frequency channel, the reproducing head is connected to an amplifier and a demodulator, the output of the latter being impressed on the mixer. The output of the magnetic reproducer in the high frequency channel is connected to an amplifier and an equalizer, and it is the output of the equalizer that is impressed on the same mixer.

It is, therefore, the principal object of this invention to provide a new method and apparatus for magnetically recording a frequency-range from zero to a frequency determined only by the upper limit recordable on the magnetic tape by recording the high frequency components of the signal along one edge of the tape, and the low frequency components as a modulated carrier along the other edge of the same tape.

Another object of this invention is to provide a reproducing system for reproducing an intelligence signal recorded on a magnetic tape having low frequency components of the intelligence signal recorded along one edge of the tape as a modulated carrier, and the high frequency components of the same signal recorded as an unmodulated signal along the other edge of the same tape.

Another object of this invention is to provide magnetic recording and reproducing systems which are capable of recording and reproducing frequencies from zero to a frequency determined only by the upper limit recordable on the magnetic tape, the overall frequency response characteristic of the systems being readily adjustable on the reproducing side of the system, so as to obtain flat frequency response characteristic over the entire frequency spectrum of the intelligence signal.

The novel features which are believed to be characteristic of the invention are set forth in the appended claims; the invention itself, however, both as to its organization and methods of operation, together with the further objects and advantages thereof, may best be understood by reference to the further description in connection with the accompanying drawings, in which:

Figures 1, 2, 3:
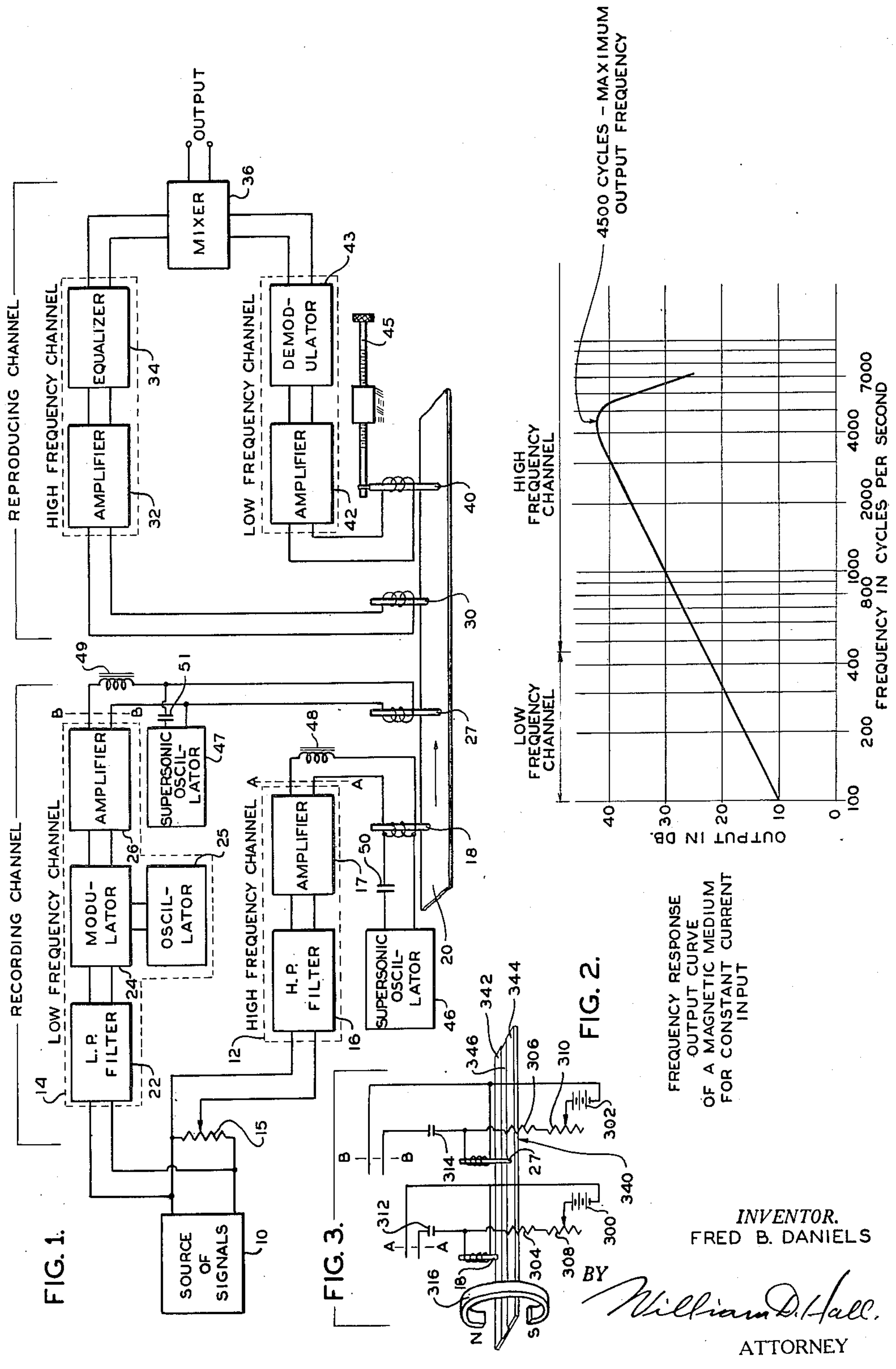
Figure 1 is a block diagram of the proposed recording and reproducing systems.
Figure 2 is a typical frequency response curve of a magnetic material currently used for recording the audio frequencies.
Figure 3 illustrates the connections of the recording heads when a D. C. biassing is used for improving the quality of the recording signal.

Referring to Fig. 1, a source of signals 10 may include all signals beginning with zero frequency and extending to the audio frequency-range in the neighborhood of 7000 cycles. This source is connected to a high frequency recording channel 12 and to a low frequency recording channel 14, a potentiometer 15 being used for adjusting and equalizing the intensity of the signal impressed on the respective recording channels. The high frequency channel consists of a high-pass filter 16 and an amplifier 17, should additional amplification be indicated. The output of the latter is connected to a recording head 18 which records the high frequency components of the signal along one edge of a magnetic tape 20. The low frequency channel consists of a low-pass filter 22, a modulator 24 connected to an oscillator 25, which furnishes the modulated frequency, an amplifier 26, and a magnetic head 27. The magnetic head 27 is positioned in recording relationship with respect to the magnetic tape 20 in such a manner that the low frequency components of the signal are recorded along the other edge of the recording tape. Sufficient transverse separation should be maintained between the low and high frequency records on the tape to prevent their interference with each other either during the recording or the reproducing cycles. Recording tape 20 may be a single tape having sufficient width for accommodating, side by side, two records, or two separate tapes so long as rigid synchronism is maintained between the two tapes. Since the use of the two separate tapes invariably brings along all the concomitant difficulties of maintaining synchronism, it is much simpler to accomplish the same result with a single tape. No equalizing circuits are shown in the recording system since it is preferable to obtain the desired degree of equalization on the reproducing side of the apparatus. This is the case since attempts to introduce equalization on the recording side may produce oversaturation of the magnetic tape, and the concomitant distortions.

In order to improve the fidelity of the recorded signals still further, supersonic frequency alternating current biases are generated by supersonic oscillators 46 and 47 and impressed upon recording heads 18 and 27 respectively. Interaction between generators 46, 47 and amplifiers 17 and 26 is prevented by condensers 50 and 51 which represent a high impedance at signal frequency but a low impedance at the biassing frequency, and choke coils 48 and 49 which represent a low impedance at signal frequency but a high impedance at the biassing frequency. Two supersonic frequency generators are used in order to prevent interaction between the low and high frequency channels. However, only one supersonic generator may be used also in connection with the two channels provided suitable decoupling circuits are used to prevent the interaction between the two channels.

The functioning of the recording system should be apparent from the given description. The parameters of the low and high-pass filters are adjusted so that their "cutoff" regions overlap slightly, preventing any loss or undesirable attenuation of any specific band of frequencies. The high frequencies are recorded in the usual manner and the frequency response characteristic of this channel is limited only by the characteristic curve of the magnetized material, such as that illustrated in Fig. 2. The low frequency channel is now in a position to record faithfully signals from zero to the maximum frequency selected for this channel, this frequency being determined largely by the frequency assigned to oscillator 25. To obtain the optimum operating conditions, oscillator 25 is assigned a frequency which is equal to the frequency at which the magnetic material gives maximum output with the input current remaining constant. With the magnetic material whose characteristic output curve is illustrated in Fig. 2 this frequency is equal to 4500 cycles. With the oscillator frequency equal to 4500 cycles, the low frequency channel may be assigned, for example, a frequency band from zero to 450 cycles, as shown in Fig. 2.

Figure 3 discloses the connections of the magnetic heads 18 and 27 of the recording channel shown in Fig. 1 when alternating current biassing is replaced with the direct current biassing. The dotted lines A—A and B—B illustrate the points at which Fig. 3 should be connected to the high and low frequency channels illustrated in Fig. 1, the above mentioned dotted lines being also indicated in Fig. 1. Thus, magnetic head 16 is now directly connected to the output of amplifier 17, while the magnetic head 27 is directly connected to the output of amplifier 26. The direct current biassing potentials are impressed on the magnetic heads by the sources of potentials 300 and 302 through fixed resistances 304 and 306 and rheostats 308, 310 respectively. The resistances 304 and 306 should have sufficiently high value to prevent shorting of the outputs of the amplifiers 17 and 26 whose outputs are also impressed on the coils of the magnetic heads through the isolating condensers 312 and 314. In Fig. 1 tape 20 is illustrated as a metallic tape while in Fig. 3 the tape consists of a thin plastic ribbon 340 with two powdered magnetic material strips 342 and 344 cemented to the plastic ribbon. The magnetic strips are separated from each other by the central portion 346 of the ribbon which is devoid of any magnetic coating. This type of powdered magnetic tape is advantageous when it is desired to avoid completely any interference between the signals impressed on the tape by the high and low frequency channels, the tape with non-magnetic spacing 346 being more effective in blocking such interference than the tape which has a continuous transverse magnetic medium. The plastic ribbon 340 may be made of a material such as cellulose acetate approximately .03" thick, and the magnetic coatings 342 and 344 may be made of any highly magnetic material such as the material commercially known by the name of powdered "Alnico," which is cemented to the ribbon by means of resinous lacquer or any other flexible cement. The powdered "Alnico" is mixed with the resinous lacquer and poured into a container provided with a slit at its bottom, the slit having two openings so that when the plastic film is passed through the slit it coats the upper side of the film with the magnetic coatings 342 and 344. During the coating process a longitudinal magnetic field is applied to the tape which supplies an orienting or polarizing field for the coatings. Experience has shown that application of the polarizing field results in the production of a tape which has superior recording properties. The powdered magnetic material may not be necessarily of the "Alnico" type; it may be replaced with any other known powdered ferro-magnetic material which is capable of producing a frequency output curve comparable to that illustrated in Fig. 2.

The functioning of the recording channel illustrated in Fig. 3 is otherwise identical to the functioning of the recording channel illustrated in Fig. 1 with the exception that the supersonic frequency biassing is now replaced with the direct current biassing. As mentioned previously in the specification, the direct current biassing results in an increased signal level and decreased signal distortion because of the fact that the direct current biassing enables one to operate on the straighter ascending or descending portions of the hysteresis curve rather than on the magnetic intensity curve. The magnetic tape is brought to a condition near saturation by a permanent magnet 316 which also serves to erase any signals previously recorded on the tape. The polarity of the biassing field may be either of the same or opposite polarity to that of the saturating field depending upon the construction of the saturating magnet, as outlined in the article "Magnetische Schallaufzeitchnung mit Filmen und Ringkopfem" by Heinz Lübeck in the "Akustische Zeitschrift," November 1937, pp. 273–295.

The reproducing system consists of two complementary reproducing channels, the high frequency channel consisting of a reproducing head 30, amplifier 32 and equalizer 34, the output of which is connected to a mixer 36. The low frequency channel consists of a reproducing head 40, amplifier 42 and demodulator 43, the output of the latter being also connected to mixer 36.

The high frequencies are amplified in amplifier 32 and are impressed on an equalizer 34 which raises the level of the frequencies on both sides of the peak to compensate for the peaked characteristic of the curve. The low frequencies, recorded as 4500 cycle modulated carrier, are amplified in amplifier 42 and demodulated in demodulator 43, whereupon they are impressed on the same mixer. The combined output of the two channels is made available on the output side of the mixer.

When a single magnetic tape is used, for the sake of the compactness of the entire recording-reproducing combination, it is desirable to make the tape as narrow as practicable without producing any magnetic interference between the high and low frequency channels, irrespective of whether the magnetic tape is with or without the nonmagnetic spacer. Since the magnetic heads have finite physical dimensions, which, as a rule, have much larger transverse dimensions than the transverse dimensions of the tape that would be suitable for recording the outputs of the high and low frequency channels, it is preferable to place the recording as well as the reproducing heads in the staggered longitudinal position with respect to the tape as illustrated in Fig. 1. With the direction of travel of the magnetic tape as indicated in the drawing, one may very readily see that the magnetic head of the high frequency channel is leading the magnetic head of the low frequency channel in the recording as well as in the reproducing systems. This is done to avoid the mechanical interference between the heads, and for facilitating their proper positioning with respect to the magnetic tape. The reproducing head of the low frequency channel is equipped with a micrometer set screw 45 which is used for adjusting the longitudinal position of this head with respect to the tape. It is obvious that the reproducing heads must be in the same relative positions with respect to the tape as the relative positions of the recording heads in order to reproduce the complementary components of the recorded signals in their proper coincidence phase relationship, and micrometer screw 45 is used for obtaining this.

The invention has been disclosed in Fig. 1 as having independent reproducing heads for the recording and reproducing channels. This is a necessary practice when the reproducing system comprises an independent unit. However, it is only on rare occasions that the magnetic tape reels are taken out of the recorder and shipped to a distant reproducer. A more customary practice is to combine the recording and reproducing equipment in a single unit, and when this is the case, the magnetic heads are used interchangeably for recording, as well as for reproducing, proper switching arrangement connecting the heads first to the recording channel and then to the reproducing channel. The same procedure may be obviously followed with the disclosed system, and this latter arrangement is more advantageous than the one disclosed in Fig. 1, since the possibility of dephased reproduction of the high and low frequency components of the recorded signal is virtually nil in this case, and there is no necessity of having any micrometer screw adjustment as the one illustrated in Fig. 1. It should be mentioned here that once the reproducing heads are adjusted so as to reproduce the high and low frequency components in their proper phase relationship in the system disclosed in Fig. 1, no further lateral adjustment of one of the reproducing heads is necessary unless it is accidentally displaced from the desired position.

The invention thus discloses mechanically and electrically simple practicable recording and reproducing systems which have frequency response characteristics superior to the known systems of this type. Low frequency components are faithfully recorded simultaneously on the magnetic tape with the equally faithful recording of the higher frequencies, and equalization of the frequency response characteristic of the recording-reproducing combination is conveniently equalized in the reproducing channel without producing any distortions.

It is believed that the construction and operation of the magnetic recording and reproducing systems as well as the advantages thereof will be apparent from the foregoing description. It should be understood that while the invention has been shown in one preferred form reasonable changes and modifications may be made without departing from the spirit of the invention as sought to be defined in the following claims.

I claim:

1. A wide frequency-range magnetic recording system including a source of signals having sub-audio and audio frequencies, a low frequency recording channel including a low-pass filter connected to said source, a carrier frequency generator for generating a frequency which is equal to the audio frequency at which said magnetic medium has maximum output for a constant current input at all frequencies, and a modulator connected to the output of said low-pass filter and of said generator, a first magnetic head connected to said modulator, a magnetic recording tape positioned with one of its side portions adjacent to one of its edges in recording relationship with respect to said first magnetic head, a high frequency recording channel including a high-pass filter connected to said source, and a second magnetic head connected to the output of said high-pass filter, said second head being in recording relationship with respect to the other side portion adjacent to the other edge of said tape, whereby the low frequency components of said source of signals are recorded as a modulated carrier along one side portion of said tape and the high frequency components are recorded directly along the other side portion of the same tape.

2. A wide frequency-range magnetic recording system as defined in claim 1 in which said magnetic recording tape further comprises a flexible nonmagnetic backing, and two transversely spaced flexible coatings of powdered magnetic material attached to said backing.

3. A wide frequency-range magnetic recording system including a magnetic tape moving at constant speed, a source of signals having an audio frequency-range, a low frequency recording channel including a low-pass filter connected to said source, a carrier frequency generator whose frequency is adjusted to the frequency at which said magnetic tape, at said speed, gives maximum output for constant current input, and a modulator connected to the outputs of said low-pass filter and said generator, whereby the output of said modulator is said carrier frequency modulated by said selected low frequencies, a first magnetic head connected to the output of said modulator, said magnetic tape being positioned with one of its side portions in recording relationship with respect to said first magnetic head, a high frequency recording channel including a high-pass filter connected to said source, and a second magnetic head connected to the output of said high-pass filter, said second head being in recording relationship with respect to the other side portion of said tape, whereby the low frequency components of said source are recorded as a modulated carrier along one side portion of said tape, and the high frequency components are recorded as an unmodulated signal along the other side portion of the same tape.

4. A wide frequency-range magnetic recording system including a magnetic tape, a source of signals having a frequency-range from zero to the upper range of audio frequencies, a low frequency recording channel including a low-pass filter connected to said source, a carrier frequency generator whose frequency is adjusted to be in the order of the frequency at which said magnetic tape gives maximum output for constant current input, and a modulator connected to the outputs of said low-pass filter and said generator, whereby the output of said modulator is a carrier frequency modulated by the selected low frequencies including said zero frequency, a first magnetic head connected to the output of said modulator, a first supersonic oscillator having its output connected to said first head, said magnetic tape being positioned with one of its edges in recording relationshp with respect to said first magnetic head, a high frequency recording channel including a high-pass filter connected to said source, a second magnetic head connected to the output of said high-pass filter, and a second supersonic oscillator having its output coupled to said second head, said second head being in recording relationship with respect to the other edge of said tape, whereby the low frequency components of said source are recorded as a modulated carrier along one side portion of said tape, and the high frequency components are recorded as an unmodulated signal along the other side portion of the same tape when both side portions of said tape are subjected to the supersonic frequency biassing by said first and second supersonic oscillators.

5. A wide frequency-range magnetic recording system including a magnetic tape, a source of signals having a frequency-range from zero to the upper range of audio frequencies, a low frequency recording channel including a low-pass filter connected to said source, a carrier frequency generator whose frequency is adjusted to be of the order of the frequency at which said magnetic tape gives maximum output for constant current input, and a modulator connected to the outputs of said low-pass filter and said generator, whereby the output of said modulator is said carrier frequency modulated by the selected low frequencies, a first magnetic head connected to the output of said modulator, a first source of direct current biassing having its output connected to said first head, said magnetic tape being positioned with one of its side portions in recording relationship with respect to said first magnetic head, a high frequency recording channel, including a high-pass filter connected to said source, a second magnetic head connected to the output of said high-pass filter, and a second source of direct current biassing having its output coupled to said second head, said second head being in recording relationship with respect to the other side portion of said tape, whereby the low frequency components of said source are recorded as a modulated carrier along one side portion of said tape, and the high frequency components are recorded as an unmodulated signal along the other side portion of the same tape when both portions of said tape are subjected to the direct current biassing by said first and second sources of direct current biassing.

6. A wide frequency-range magnetic recording system including a source of signals having sub-audio and audio frequencies, a low frequency recording channel including a low-pass filter connected to said source, a carrier frequency generator, and a modulator connected to the outputs of said low-pass filter and said generator, a first choke coil, a first magnetic head connected to said modulator through said first choke coil, a first supersonic oscillator capacitively coupled to said first head, a magnetic recording tape positioned with one of its edges in recording relationship with respect to said first magnetic head, a high frequency recording channel including a high-pass filter connected to said source, a second choke coil, a second magnetic head connected to the output of said high-pass filter through said second choke coil, and a second supersonic generator capacitively coupled to said second head, said second head being in recording relationship with respect to the other edge of said tape, whereby the low frequency components of said source of signals are recorded as a modulated carrier along one edge of said tape, and the high frequency components are recorded directly along the other edge of the same tape while said tape is subjected to an alternating current biassing by said first and second oscillators.

7. A wide frequency-range magnetic recording system including a source of signals having sub-audio and audio frequencies, a low frequency recording channel including a low-pass filter connected to said source, a carrier frequency generator whose frequency lies in the upper part of the range of frequencies to be reproduced by said system, and a modulator connected to the outputs of said low-pass filter and said generator, a first magnetic head, a first direct current source and a first high resistance serially connected to said first current source, said head being capacitively coupled to said modulator and directly connected to said first current source through said resistance, a magnetic recording tape positioned with one of its edges in recording relationship with respect to the first magnetic head, a high frequency recording channel including a high-pass filter connected to said source of signals, a second source of direct current potential, and a second high resistance serially connected to said second source, and a second magnetic head capacitively coupled to the output of said high-pass filter and directly connected to said second source through said second resistance, said second head being in recording relationship with respect to the other edge of said tape, whereby the low frequency components of said source of signals are recorded as a modulated carrier along one edge of said tape and the high frequency components are recorded directly along the other edge of the same tape while said tape is subjected to the direct current biassing by said first and second sources.

8. A wide frequency-range magnetic reproducing system including a magnetic tape having high and low frequency components of a single intelligence signal recorded upon said tape as two complementary high and low frequency records with the high frequency components being recorded along one edge of said tape, and the low frequency components of said signal being recorded as a carrier frequency modulated by said low frequency components along the other edge of said tape, a first magnetic head in reproducing relationship with respect to said high frequency record on said tape, a first amplifier connected to said first head, a second magnetic head in reproducing relationship with respect to said low frequency record on said tape, a second amplifier connected to said second head, a demodulator connected to said second amplifier, and a mixer stage connected to the outputs of said first amplifier and said demodulator, said mixer stage reproducing the combined outputs of said first and second magnetic heads as said single intelligence signal.

9. A wide frequency-range magnetic reproducing system including a magnetic tape having high and low frequency components of a single intelligence signal recorded upon said tape as two complementary high and low frequency records with the high frequency components recorded along one edge of said tape, and the low frequency components of said signal recorded as a carrier frequency modulated by said low frequency components along the other edge of said tape, low frequency and high frequency reproducing channels, each of said channels being coupled respectively to a magnetic head disposed in reproducing relationship with respect to said low and high frequency records on said tape, said low frequency channel including an amplifier, and a demodulator, and said high frequency channel including an amplifier and an equalizer, the output of said high frequency channel being adjusted to compensate for the peaked frequency response characteristic of said tape in the higher region of frequencies, and a mixer stage connected to the outputs of said demodulator and said equalizer, said mixer stage reproducing the combined outputs of said equalizer and said demodulator as said single intelligence signal compensated for the frequency-selective attenuation introduced by said tape.

10. The system of claim 9, further including adjustment means connected to one of said heads, for adjusting the position of said one head with respect to said tape in order that the phase relationship between said recorded high and low frequency components may be reproduced.

11. A wide frequency-range magnetic recording system for recording input signals lying within the range between zero and the upper audio frequencies, including means for separating said signals into low and high frequency bands, means for generating a carrier wave having a frequency in the vicinity of said upper audio frequencies, means for modulating said carrier wave by only said low frequency band, and means for recording said high frequency band while simultaneously recording said low frequency band as a modulated carrier, whereby the wide frequency range of said input signals is uniformly recorded with little loss and distortion.

12. The system of claim 11, wherein the frequency of said carrier lies within said high frequency band.

13. A system for recording and reproducing input signals lying within the range between zero and the upper audio frequencies, including means for separating said signals into low and high frequency bands, means for generating a carrier wave having a frequency in the vicinity of said upper audio frequencies, means for modulating said carrier wave only by said low frequency band, means for recording said high frequency band while simultaneously recording said low frequency band as a modulated carrier, means for separately reproducing the recorded modulated carrier and high frequency band signals, means for demodulating the reproduced modulated carrier band signals, and means for mixing the demodulated low frequency band signals together with the reproduced high frequency band signals.

14. The system of claim 13, wherein the frequency of said carrier lies within said high frequency band.

15. The system of claim 14, wherein the frequency of said carrier is equal to the audio frequency within said high frequency band at which said recording means gives a maximum output with a constant input level at varying frequencies.

FRED B. DANIELS.

REFERENCES CITED

The following references are of record in the file of this patent:

UNITED STATES PATENTS

| Number | Name | Date |
|---|---|---|
| 1,640,881 | Carlson | Aug. 30, 1927 |
| 1,764,120 | Robbins | June 17, 1930 |
| 1,847,860 | Best | Mar. 1, 1932 |
| 1,886,616 | Alverson | Nov. 2, 1932 |
| 1,949,840 | Languepin | Mar. 6, 1934 |
| 2,213,246 | Heller | Sept. 3, 1940 |
| 2,251,300 | Star | Aug. 5, 1941 |
| 2,351,003 | Camras | June 13, 1944 |
| 2,351,011 | Camras | June 13, 1944 |